(12) United States Patent
Leberquer et al.

(10) Patent No.: US 8,880,245 B2
(45) Date of Patent: Nov. 4, 2014

(54) METHOD AND DEVICE FOR AIDING THE MANAGEMENT OF THE FLIGHT OF AN AIRCRAFT

(71) Applicant: Airbus Operations (S.A.S.), Toulouse (FR)

(72) Inventors: Charles Renault Leberquer, Toulouse (FR); Florian Constans, Pibrac (FR); Josep Boada-Bauxell, Toulouse (FR); Pascale Louise, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 13/956,872

(22) Filed: Aug. 1, 2013

(65) Prior Publication Data

US 2014/0039731 A1    Feb. 6, 2014

(30) Foreign Application Priority Data

Aug. 2, 2012    (FR) .................................... 12 57554

(51) Int. Cl.
*B64C 19/00* (2006.01)
*G05D 1/04* (2006.01)

(52) U.S. Cl.
CPC .............. *B64C 19/00* (2013.01); *G05D 1/042* (2013.01)
USPC ............................................................ 701/3

(58) Field of Classification Search
CPC ...................................................... G08G 5/003
See application file for complete search history.

(56) References Cited

U.S. PATENT DOCUMENTS

| | | | | |
|---|---|---|---|---|
| 4,021,009 A * | 5/1977 | Baker et al. | | 244/180 |
| 5,978,715 A | 11/1999 | Briffe et al. | | |
| 6,163,743 A * | 12/2000 | Bomans et al. | | 701/3 |
| 6,571,171 B1 * | 5/2003 | Pauly | | 701/528 |
| 6,995,690 B1 | 2/2006 | Chen et al. | | |
| 7,783,393 B2 * | 8/2010 | Tucker et al. | | 701/4 |
| 8,073,578 B1 * | 12/2011 | McCusker | | 701/3 |
| 8,099,201 B1 * | 1/2012 | Barber et al. | | 701/4 |
| 8,150,623 B2 * | 4/2012 | Bitar et al. | | 701/467 |
| 8,633,835 B1 * | 1/2014 | Spencer | | 340/977 |
| 8,725,322 B2 * | 5/2014 | Botargues et al. | | 701/10 |
| 2008/0300736 A1 * | 12/2008 | Tarleton et al. | | 701/3 |
| 2008/0312779 A1 | 12/2008 | Sacle et al. | | |
| 2009/0259351 A1 * | 10/2009 | Wachenheim et al. | | 701/7 |
| 2010/0073359 A1 * | 3/2010 | Suddreth et al. | | 345/419 |
| 2010/0250026 A1 * | 9/2010 | Deker et al. | | 701/3 |
| 2011/0118908 A1 * | 5/2011 | Boorman et al. | | 701/14 |
| 2011/0137493 A1 * | 6/2011 | Dacre-Wright et al. | | 701/3 |
| 2011/0137495 A1 * | 6/2011 | Sacle et al. | | 701/3 |
| 2011/0153204 A1 * | 6/2011 | Coulmeau et al. | | 701/204 |
| 2011/0295501 A1 * | 12/2011 | Gutierez-Castaneda et al. | | 701/206 |
| 2012/0022723 A1 * | 1/2012 | Botargues et al. | | 701/4 |
| 2012/0253557 A1 * | 10/2012 | Min et al. | | 701/3 |
| 2012/0253562 A1 * | 10/2012 | Wachenheim et al. | | 701/4 |
| 2013/0345905 A1 * | 12/2013 | Parthasarathy | | 701/3 |

* cited by examiner

OTHER PUBLICATIONS

French Search Report for Application No. FR 1257554 dated Jun. 17, 2013.

*Primary Examiner* — John R Olszewski
*Assistant Examiner* — Navid Ziaeianmehdizadeh
(74) *Attorney, Agent, or Firm* — Jenkins, Wilson, Taylor & Hunt, P.A.

(57) ABSTRACT

The device comprises servocontrol means which automatically control, in a combined manner, an automatic thrust system of the aircraft and airbrakes of the aircraft, as a supplement to usual means for steering the vertical trajectory, so that the aircraft attains a speed setpoint and/or altitude setpoint, at the location defined by a geographical constraint.

15 Claims, 3 Drawing Sheets

METHOD AND DEVICE FOR AIDING THE MANAGEMENT OF THE FLIGHT OF AN AIRCRAFT

TECHNICAL FIELD

The present invention relates to a method and a device for aiding the management of the flight of an aircraft, in particular of a transport airplane.

BACKGROUND

It is known that, in a dynamic operational environment, the proper management of the flight of an aircraft resides in essence in the capacity of the crew to adjust and control the trajectory followed and the associated speed profile.

Most aircraft have means allowing the control and maintenance of flight parameters with the aid of an automatic piloting system. This system allows, for example, the maintenance of an altitude, of a speed, of a vertical speed, of a heading, etc. Aircraft fitted with an automatic piloting system which makes it possible to follow guidance setpoints in an automatic manner, are provided with an item of equipment (or control unit), called an FCU ("Flight Control Unit") on airplanes of AIRBUS type and an MCP ("Mode Control Panel") on airplanes of BOEING type, which allows a pilot of the airplane to enter guidance setpoints into the guidance system. Generally, the pilot chooses a guidance setpoint, and then he commands the engagement (activation) of the associated guidance mode, so that it takes into account either the value entered (in a so-called "selected" mode), or a value calculated by the system according to diverse criteria (as for example in the particular case of following a preprogrammed flight plan).

A key element of the process for managing the servocontrolled trajectory and the speed is therefore the transmission of the crew's intentions to the onboard systems of the aircraft.

The management of the aircraft's vertical flight plan involves problematic issues of managing the total energy, combination of the potential energy (related to the altitude) and of the kinetic energy (related to the speed). Any modification of the trajectory in the vertical plane will have an impact on the evolution of the speed of the aircraft and vice versa, the modification of the total energy of the aircraft being limited and given by the aerodynamic and propulsive performance of the aircraft.

In a dynamic operational environment, it may happen that the crew wishes to rapidly modify the altitude of the aircraft or else its speed, as well as the way in which the aircraft will achieve this or these new objectives. The crew may need to know at which horizon, namely at which distance ahead of the aircraft along the servocontrolled trajectory, the aircraft will actually attain these objectives, which horizon depends on the performance of the aircraft.

For example, the aircraft may have:
to enter an airspace at a maximum imposed speed; or
to leave its initial flight level so as to achieve a lower flight level before a given distance, doing so in order to satisfy constraints of separability with other aircraft flying at this initial flight level.

Though the automatic piloting systems and the associated interfaces make it possible to modify the setpoints of the trajectory in the vertical plane (altitude or speed), the interfaces do not make it possible to view directly where the aircraft is going or only in a partial and approximate manner. Moreover, the onboard systems for automated flight management do not offer the possibility of directly adjusting the position at which these speed and altitude objectives are attained.

The object of the present invention is to remedy the aforementioned drawbacks. It relates to a method for aiding the management of the flight of an aircraft, in particular of a transport airplane, which allows in particular the crew to manage by objective the changes of speed and the changes of altitude of the aircraft.

SUMMARY OF THE INVENTION

For this purpose, according to the invention, said method, according to which there is envisaged an interface unit allowing a pilot to enter at least one of the following setpoints: a speed setpoint and an altitude setpoint, as well as means of automatic piloting which apply, in an automatic manner to said aircraft, setpoints thus entered,
is noteworthy in that:
a) interface means are envisaged, moreover, allowing a pilot to generate a geographical constraint represented by a distance ahead of the aircraft, defining a position at which he wishes that a setpoint entered be attained; and
b) an automatic thrust system of the aircraft and airbrakes of the aircraft (as a supplement to usual means for steering the vertical trajectory) are automatically servocontrolled, in a combined manner, so that the aircraft attains said setpoint entered, at the position defined by said geographical constraint.

Thus, the present invention offers the pilot the possibility of directly modifying the position at which an objective defined in terms of speed setpoint and/or altitude setpoint is attained and makes it possible to ensure the carrying out thereof with the aid of appropriate automatic servocontrol (adjustment of the thrust of the engines and extension of the airbrakes).

The method in accordance with the invention also presents the following advantages:
by using the distance in front of the aircraft to indicate where the pilot wishes to attain an objective in terms of altitude and/or speed, the complexity and the limitation of having to pinpoint this constraint on a flight plan are circumvented. Moreover, this notion of distance in front of the aircraft is interpretable whatever the mode of guidance of the aircraft;
a pilot who wants to shorten the distance traversed before the attainment of a target value of altitude (respectively of speed) need only define the new distance. Thereafter, the invention manages automatically in particular the airbrakes (as a supplement to usual means for steering the vertical trajectory) so as to attain the target while satisfying the geographical constraint. The piloting task is simplified since the manual control of the airbrakes no longer forms part of his workload; and
combined (or integrated) management of the automatic thrust system and of the airbrakes avoids situations where the two corresponding control members are used at the same time and helps to reduce fuel consumption.

Furthermore, advantageously, in a step c), the trajectory flown by the aircraft is determined according to the setpoints of the active guidance mode and according to the thrust and airbrakes profile controlled so as to attain said setpoint at said geographical constraint, and at least one part of said trajectory is presented on a viewing screen, together with the locations at which the speed and altitude setpoints are attained.

More precisely, within the framework of the invention, these items of information are presented:

on a navigation parameters vertical viewing screen of the flight deck of the aircraft, of VD ("Vertical Display") type; and/or on a navigation parameters horizontal viewing screen, of ND ("Navigation Display") type.

For any modification of the altitude parameter and/or of the speed parameter servocontrolled, this display in accordance with the invention thus allows easy understanding by the crew of the location where the aircraft will attain its altitude and/or speed objective.

Moreover, the invention envisaging the carrying out of automatic control of the airbrakes of the aircraft, the workload of the crew is reduced with respect to the usual control. Indeed, today the airbrakes are controlled manually by the crew. When the pilot considers that the deceleration and/or descent rates are not sufficient to attain target values at the desired location, he invokes a deflection of the airbrakes. On most aircraft, the control means for the airbrakes consists of a handle, the control of the airbrakes being managed by the position of this handle.

Within the framework of the present invention, the pilot can indicate the distance ahead of the aircraft (at which he wishes that a setpoint entered be attained) in various ways, and in particular in a digital manner in a dedicated system page.

However, in a preferred embodiment, there is envisaged on said viewing screen at least one graphical object which is effected in the form of an interaction means which represents:

on the one hand, a restitution element which indicates the location of attainment of said setpoint; and on the other hand, a control element which can be grasped and moved by a pilot in order to modify the distance ahead of the aircraft, at which he wishes that a setpoint entered be attained, and thus to generate a geographical constraint.

Moreover, in the case where a geographical constraint can no longer be upheld by the servocontrol of the means of the aircraft, for example subsequent to a change of the outside conditions (wind, etc.), the element indicating the geographical constraint can change appearance to alert the crew that the constraint will not be upheld. A restitution element giving the actual location of attainment of the target is in this case again presented, in addition to the current trajectory.

In a particular embodiment, an airbrakes profile which ensures the attainment of the geographical constraint generated is determined by the pilot while satisfying at least one particular optimization criterion. This criterion can be an optimization in terms of fuel consumption, cabin comfort and/or fatigue of the structure. This criterion or these criteria can be relaxed with the aim of absorbing disturbances (wind, etc.) and errors of modeling.

Moreover, advantageously:

the point at which an entered setpoint is attainable at the earliest possibility by the aircraft is determined, and a symbol which locates this point is presented on a viewing screen. This allows the crew, when the aircraft is stabilized at a descent rate, to ascertain their operational margins in the management of the speed if they wish to use the airbrakes; and/or a predicted trajectory liable to be followed by the aircraft with the airbrakes deflected to the maximum is determined and is displayed.

Furthermore, advantageously, the transient phases of the flight trajectory, which in a usual manner exist during a transition in slope and/or in acceleration subsequent in particular to the modification of the flight parameters or the attainment of a setpoint, are determined and are integrated into the display.

Furthermore, in a particular embodiment, when the aircraft is climbing or descending while complying with a vertical speed setpoint or a slope setpoint, means allowing an operator to define a new corresponding target value are envisaged. More precisely, when the aircraft is in climb or descent mode while complying with a vertical speed (V/S) or a slope (FPA), it is thus possible to define a new guidance target value V/S or FPA on the basis of the designation of a point in front of the aircraft of the attainment of the target altitude.

Moreover, in a particular embodiment, said method is applied:

to so-called preadjusted setpoints, which will only be applied to the aircraft after a validation; or to the particular case of following a preprogrammed flight plan, as specified hereinbelow.

The present invention also relates to a device for aiding the management of the flight of an aircraft, in particular of a transport airplane.

For this purpose, according to the invention, said device of the type comprising an interface unit allowing a pilot to enter at least one of the following setpoints: a speed setpoint and an altitude setpoint, as well as means of automatic piloting which apply, in an automatic manner to said aircraft, setpoints entered with the aid of said interface unit, is noteworthy in that it comprises moreover:

interface means allowing a pilot to generate a geographical constraint, the geographical constraint being represented by a distance ahead of the aircraft, defining a position at which the pilot wishes that a setpoint entered be attained; and servocontrol means which automatically control, in a combined manner, an automatic thrust system of the aircraft and airbrakes of the aircraft so that the aircraft attains said setpoint entered, at the position defined by said geographical constraint.

Furthermore, in a particular embodiment, said device comprises, moreover, means for determining, in an automatic manner, the trajectory followed by the aircraft so as to comply with said setpoint and said geographical constraint, and display means for presenting this trajectory on at least one viewing screen (of ND type or of VD type).

Advantageously, said viewing screen comprises at least one graphical object which is effected in the form of an interaction means which represents:

on the one hand, a restitution element which indicates the location of attainment of said setpoint; and on the other hand, a control element which can be grasped and moved by a pilot in order to modify the distance ahead of the aircraft, at which he wishes that a setpoint entered be attained, and thus to generate a geographical constraint.

Furthermore, in the case where a geographical constraint can no longer be upheld by the servocontrol of the means of the aircraft, for example subsequent to a change of the outside conditions (wind, etc.), the element indicating the geographical constraint can change appearance to alert the crew that the constraint will not be upheld. A restitution element giving the actual location of attainment of the target is in this case again presented, in addition to the current trajectory.

Moreover, in a particular embodiment, said servocontrol means comprise means of automatic determination of commands of the automatic thrust system and airbrakes.

The present invention also relates to an aircraft, in particular a transport airplane, which is furnished with a device for aiding the management of the flight, such as that aforementioned.

BRIEF DESCRIPTION OF THE DRAWINGS

The figures of the appended drawing will elucidate the manner in which the invention may be embodied. In these figures, identical references designate similar elements.

DETAILED DESCRIPTION

Figure 1:
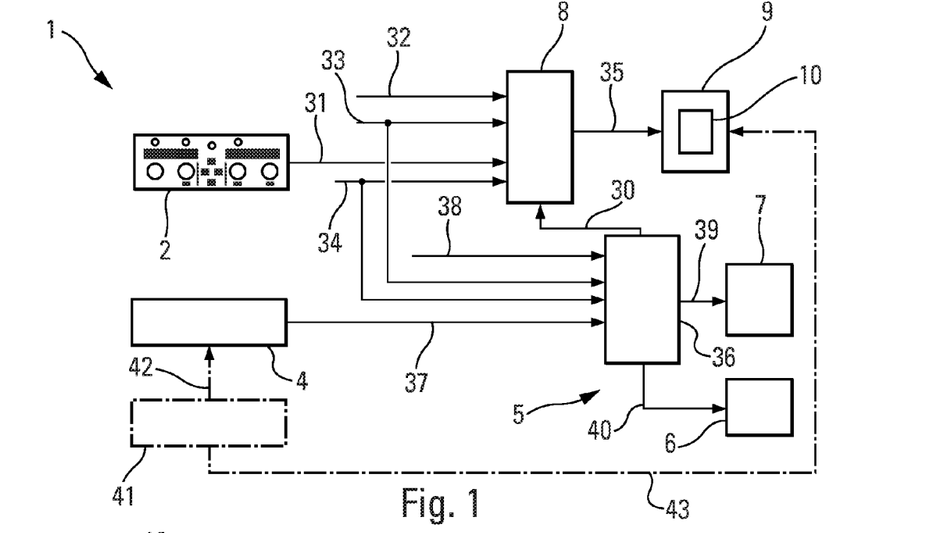
FIG. 1 is the schematic diagram of a device for aiding the management of the flight in accordance with the invention.

The device 1 in accordance with the invention and represented schematically in FIG. 1 is intended to aid the management of the flight of an aircraft (not represented), in particular of a transport airplane.

Said device 1 which is onboard the aircraft is of the type comprising:
- a flight control interface unit 2, preferably of FCU ("Flight Control Unit") type, which allows a pilot to enter into the device 1 at least one of the following setpoints: a speed setpoint and an altitude setpoint; and
- means of automatic piloting which apply, in an automatic manner to said aircraft, setpoints entered with the aid of said interface unit 2.

According to the invention, said device 1 comprises moreover, as represented in FIG. 1:
- interface means 4 which allow a pilot to generate a geographical constraint representing a distance ahead of the aircraft, at which he wishes that a setpoint (of speed or of altitude) entered with the aid of the interface unit 2 be attained; and
- servocontrol means 5 which automatically control, in a combined manner, an automatic thrust system 6 of the aircraft and airbrakes 7 of the aircraft, as a supplement to the usual means for steering the vertical trajectory, so that the aircraft attains said setpoint entered, at the location defined by said geographical constraint.

Thus, said device 1 offers the pilot the possibility of directly modifying the position at which an objective defined in terms of speed setpoint and/or altitude setpoint is attained and ensures the carrying out thereof with the aid of appropriate servocontrol (adjusting of the thrust of the engines 6 and of the extension of the airbrakes 7).

The device 1 in accordance with the invention also presents the following advantages:
- by using the distance in front of the aircraft to indicate where the pilot wishes to attain an objective in altitude and/or speed, the complexity and the limitation of having to pinpoint this constraint on a flight plan are circumvented. Moreover, this notion of distance in front of the aircraft is interpretable whatever the mode of guidance of the aircraft;
- a pilot who wants to shorten the distance traversed before the attainment of a target value of altitude (respectively of speed) need only define the new distance. Thereafter, the device 1 automatically manages the engines and the airbrakes so as to attain the target while satisfying the geographical constraint. The piloting task is simplified, since the manual control of the airbrakes no longer forms part of his workload; and
- combined (or integrated) management of the automatic thrust system 6 and of the airbrakes 7 avoids situations where the two control members are used at the same time and helps to reduce fuel consumption.

Furthermore, in a particular embodiment, said device 1 comprises, moreover, means 8 for determining, in an automatic manner, the trajectory followed by the aircraft so as to comply with a setpoint and a corresponding geographical constraint, and display means 9 for displaying this trajectory on a viewing screen 10.

For any modification of the altitude parameter and/or of the speed parameter servocontrolled, this display in accordance with the invention allows easy understanding by the crew of the location where the aircraft will attain its altitude and/or speed objective.

Figure 2:
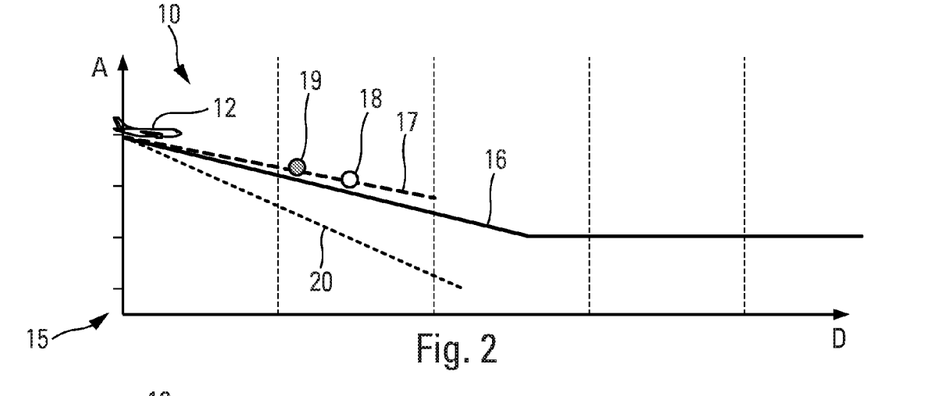
FIGS. 2 to 4 schematically represent various displays of navigation data, which make it possible to properly highlight the essential characteristics of the present invention.
Figure 3:
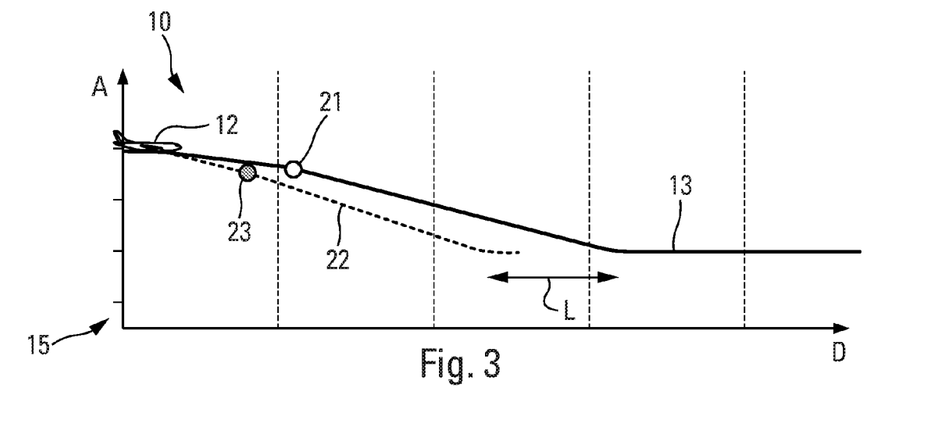
Figure 4:
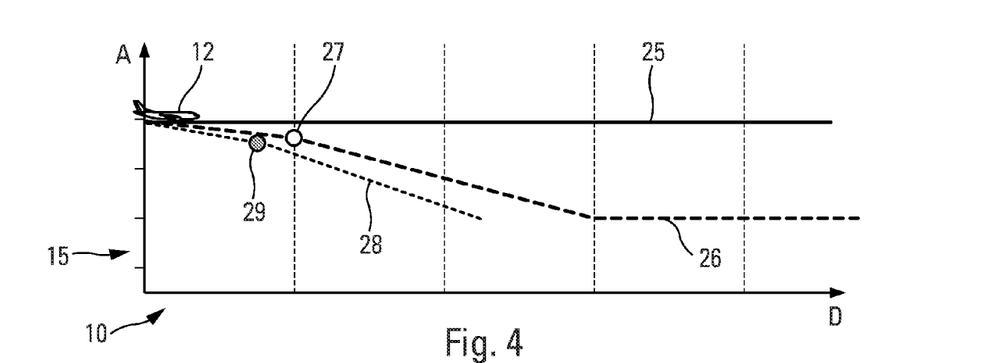

More precisely, within the framework of the present invention said display means 9 are able to present:
- the vertical trajectory (of a trajectory considered) on a navigation parameters vertical viewing screen 10 of the flight deck of the aircraft, of VD ("Vertical Display") type, as represented for example in FIGS. 2 to 4; and/or
- the lateral trajectory (of a trajectory considered) on a navigation parameters horizontal viewing screen, of ND ("Navigation Display") type.

The display carried out on a VD screen or on an ND screen applies of course to all the elements liable to be displayed within the framework of the present invention The device 1 in accordance with the invention therefore allows the crew to define geographical constraints for the attainment of a target altitude and/or of a target speed. Within the framework of the present invention, the pilot can indicate the distance ahead of the aircraft (at which he wishes that a setpoint entered be attained) in various ways, and in particular in a digital manner in a dedicated system page.

However, in a variant embodiment, said viewing screen 10 comprises at least one graphical object 84 (FIGS. 9 and 10) which is effected in the form of an interaction means which represents:
- on the one hand, a restitution element which presents the location of attainment of the setpoint (of speed or of altitude); and
- on the other hand, a control element (means 4) which can be grasped and moved by a pilot in order to modify the distance ahead of the aircraft, at which he wishes that a setpoint entered be attained, and thus to generate a geographical constraint.

In this variant embodiment, the predictions of attainment of the setpoints (altitude, speed) are displayed in a graphical manner through the graphical symbols or objects 84, and the crew can therefore interact with these symbols to define a rendezvous. Within the framework of the invention, a distance in front of the aircraft where the crew wishes that a setpoint be attained is called a "rendezvous". This variant embodiment allows more intuitive interaction for the pilot by virtue of the graphical feedback of the trajectories/symbols, subsequent to the creation of a rendezvous in terms of altitude and/or speed. This also makes it possible to be able to place a rendezvous in terms of energy with respect to other elements displayed such as an entry to an ATC zone, the terrain, the weather, the flight plan.

In a particular embodiment, the device 1 comprises moreover a predictive control of airbrakes. By ascertaining the capabilities of the aircraft to attain a target in a nominal manner, an airbrakes profile is determined which ensures the attainment of the geographical constraint generated by the pilot while satisfying at least one particular criterion. This criterion can be an optimization in terms of fuel consumption, cabin comfort and/or fatigue of the structure. This criterion or these criteria can be relaxed with the aim of absorbing disturbances (wind, etc.) and errors of modeling.

In another embodiment, the servocontrol of the airbrakes 7 can be extended to the particular case of following a preprogrammed flight plan when the altitude and/or speed constraints are known in advance and geographically positioned. The device 1 knowing the next altitude and/or speed constraint, directly proposes the necessary level of the airbrakes required to attain the target just where the altitude and/or speed constraint is situated.

Moreover, in another embodiment, the predictions of the vertical profile and of speed take into account the profile of use of the airbrakes corresponding to what the servocontrol will follow in order to uphold the altitude and/or speed constraint. This embodiment makes it possible to have consistency between the objectives fixed and the prediction elements corroborating the attainment of this objective.

In a variant embodiment, the earliest possible attainment of the target speed can also be calculated with the assumption of a descent according to the current and indicated slope. This allows the crew to understand, when the aircraft is stabilized at a descent rate, what are their operational margins in the management of the speed if they wish to use the airbrakes, as represented in FIG. 2.

Each of FIGS. 2 to 4 illustrates, by way of example, a display of a vertical plane on a screen 10 of VD type, which comprises in particular:
- a symbol 12 illustrating the position of the aircraft;
- a graphic 15 illustrating a vertical plane and comprising a distance scale D and an altitude scale A; and
- on this graphic 15, the vertical profile of the predicted trajectory which is highlighted by a thick continuous line trace.

In FIG. 2, said vertical profile 16 relates to the vertical trajectory predicted for the following characteristics of the aircraft: idling thrust, smooth configuration, airbrakes retracted.

Moreover, in FIG. 2, are also represented:
- a thick dashed trace 17, which illustrates the vertical profile according to the current slope of the aircraft;
- a symbol 18 represented in the form of a circle, which indicates the position at which the speed target will be attained according to the current slope;
- a symbol 19 represented in the form of a shaded circle, which indicates the position at which the target speed is attainable at the earliest possibility, with the airbrakes deflected to the maximum, according to the current slope, in accordance with the last variant embodiment; and
- a thin dashed trace 20, which illustrates the vertical profile with the airbrakes deflected to the maximum.

In another variant embodiment, an integrated calculation of the vertical profile and speed including the transient phases can be used to predict the location of attainment of the target values (altitude and speed), in particular in the case where the aircraft is off the flight plan.

In this variant embodiment, the setpoints entered on the interface unit 2 for the control of the flight (FCU) comprise:
- vertical setpoints;
  - the altitude;
  - the vertical speed ("Vertical Speed" or VS);
  - the slope ("Flight Path Angle" or FPA);
- lateral setpoints:
  - the heading ("HEADING" or HDG);
  - the track ("TRACK" or TRK);
- speed setpoints:
  - the air speed ("Current Air Speed" or CAS);
  - the Mach; and
- a selection of guidance modes (not following flight plan):
  - a mode of maintaining altitude;
  - a mode of achieving altitude (climb or descent) while complying with an air speed;
  - a mode of achieving altitude (climb or descent) while complying with a slope;
  - a climb or descent mode while complying with a vertical speed;
  - a mode of maintaining or of achieving a heading;
  - a mode of maintaining or of achieving a track;
  - a mode of capture or of maintaining of the approach axis on a horizontal plane;
  - a mode of capture or of maintaining of the approach axis on a horizontal and vertical plane; and
  - a taking into account of the so-called "armed" guidance modes, engagement of which will occur when appropriate engagement conditions are fulfilled.

In this variant embodiment, the general principle consists in predicting and displaying the vertical and speed profile of the aircraft in all the modes of guidance of the aircraft, and in particular in the modes other than the following of the flight plan by taking account of all or some of the following elements:
- current parameters of the aircraft (air speed, altitude, angle of roll, mode engaged, current slope, current longitudinal and vertical acceleration, mass, centering);
- selected or armed modes;
- setpoints chosen by the crew;
- a lateral profile (angle of roll profile);
- a profile of mobilization of the surfaces of the aircraft (airbrakes, configurations of the aircraft for the approach) and optionally of an associated thrust profile; and
- an atmospheric profile (wind, temperature) which is either based on the current conditions, or based on an existing modeling arising from the flight management system.

In this variant embodiment, the vertical and speed profile relies on:
- the knowledge and the modeling of the aircraft's flight guidance laws in each of its guidance modes;
- the modeling of the dynamics of the aircraft in the atmosphere;
- the knowledge of the logic and conditions for transition from one mode of guidance to another; and
- the knowledge of a model of the aerodynamic performance of the aircraft.

This vertical profile/speed integrated prediction allows the crew to have realistic predictions, in particular:
- in terms of speed:
  - when the aircraft is not stabilized at a descent rate;
  - when the aircraft will be stabilized in speed only once the descent has been completed;
  - when the descent profile is not effected at constant slope; and in terms of altitude:
when there is, at the same time, a change of speed and the aircraft is not guided with a mode imposing a fixed descent slope.

The management of the airbrakes is then simpler, since the pilot has a prediction feedback which is precise, stable and immediate subsequent to the modification of a setpoint and then of a rendezvous related to this setpoint.

This same calculation can be conducted with the assumption of the airbrakes deployed to the maximum, to show the pilot his operational margins if he wishes to use the airbrakes, as represented in FIG. 3. This FIG. 3 shows the vertical profile 13 of the predicted trajectory taking into account the speed profile and the mode of guidance (namely in this example, a mode of descent without constraint), and a symbol 21 represented in the form of a circle, which indicates the position at which the speed target will be attained along said predicted trajectory 13.

In this FIG. 3, are also represented:
by dashes, a predicted vertical trajectory 22 with the airbrakes deflected to the maximum, while taking into account the mode of guidance and the associated speed profile (namely in this example, a mode of descent without constraint); and
a symbol 23 represented in the form of a shaded circle, which indicates the position at which the speed target is attainable at the earliest possibility (with the airbrakes deflected to the maximum).

In FIG. 3, we have added, with an aim of explaining the invention, a double arrow L which is not displayed by the display means 9 on the screen 10. This double arrow L illustrates the distance margin in the case of using the airbrakes to attain the next altitude target, with respect to the predicted trajectory 13 without deflection of the airbrakes.

Furthermore, in a particular embodiment, when the aircraft is in climb or descent mode while complying with a vertical speed (V/S) or a slope (FPA), the device 1 envisages means for defining a new guidance target value V/S or FPA on the basis of the designation of a point in front of the aircraft of the attainment of the target altitude.

The setpoints entered on the interface unit 2 for flight control (FCU) can be taken into account directly by the device 1 as soon as their value is modified. In certain cases, it is necessary to validate a modification of the setpoint in order for it to be taken into account (for example, a setpoint of change of flight level from a flight level following mode). In these cases, the setpoints, before validation, are termed preadjusted setpoints (or "presets"). Thus, in a particular embodiment, the characteristics of the present invention are extended to such preadjusted setpoints. A speed/altitude integrated prediction can be carried out on the basis of said preadjusted setpoints with a current airbrake profile and a limit airbrake profile (full deflection of the airbrakes), as represented in FIG. 4. This FIG. 4 is a representation of the preadjusted speed and vertical prediction and of a preadjusted limit arising from a vertical/speed integrated calculation including the transient phases (case of a preadjusted descent value without constraint with a preadjusted selected speed).

In this FIG. 4 have been represented:
by a thick continuous dash, the current vertical trajectory 25;
by thick dashes, the predicted vertical trajectory 26 preadjusted taking into account the preadjusted speed profile and the preadjusted guidance mode (namely in this example a mode of descent without constraint), with a symbol 27 represented in the form of a circle, which indicates the position at which the preadjusted target speed will be attained along this trajectory 26; and
by thin dashes, the predicted vertical trajectory 28 preadjusted with the airbrakes deployed to the maximum taking into account the preadjusted speed profile and the preadjusted guidance mode (namely in this example a mode of descent without constraint), with a symbol 29 represented in the form of a shaded circle, which indicates the position at which the preadjusted target speed is attainable at the earliest possibility along said trajectory 28, with the airbrakes deployed to the maximum.

The crew can also create various so-called "preset" rendezvous in terms of altitude and/or speed. This allows the pilot to observe the margins afforded to him by the airbrakes, in particular in the case of an ATC negotiation, with a constraint that is hard to achieve without their use.

A detailed description of the device 1 of FIG. 1 is carried out hereinbelow.

The means 8 of said device 1 take into account:
the setpoints of the unit 2, received through a link 31;
the previous and current flight parameters received through a link 32;
the mode of guidance, received through a link 33;
a profile of the evolution of the surfaces (airbrake, aircraft configuration, gear) and optionally of the thrust, received through a link 30, as well as a current level of the surfaces, received through the link 33; and
a profile of the atmospheric conditions (temperatures, wind) along the trajectory, received through a link 34.

The means 8 provide as output the lateral (x,y) and vertical (s,z) trajectories, as well as the position (x,y,s,z) of attainment of the speed and altitude setpoints, which are transmitted to the display means 9 (via a link 35).

The predicted trajectory calculation, implemented by the means 8, therefore uses, as input, a current airbrakes profile (received through the link 30) and the current setpoints of the selected mode. However, this same calculation can be accompanied with, as input, preadjusted setpoints and/or a profile of airbrakes extended to the maximum until the attainment of the setpoint or setpoints entered by the pilot. The use of the current prediction with a maximum deflection of the airbrakes makes it possible to predict the attainment of the setpoint selected at the earliest possibility and therefore to bound a rendezvous in the means 4 for defining the constraint.

The servocontrol means 5 comprising means 36 for calculating the command to achieve the constraint. These calculation means 36 take into account the items of information of the geographical constraint (link 37) and the targets associated with this constraint. These calculation means 36 also take into account the atmospheric conditions (link 34), the aircraft configuration (link 33) and the current parameters of the aircraft (link 38). An airbrakes command is calculated on the basis of these items of information, this command is thereafter dispatched to the kinematics of the spoilers (link 39). This spoiler kinematics forms the tie between airbrakes command and the deflection of the aerodynamic surfaces. At the same time, a mean airbrakes profile and optionally an associated thrust level are provided to the trajectory prediction means 8 (link 30). The latter take account of this value so as to display the trajectory that the aircraft will fly. Likewise, a command is also dispatched to the engines 6 (link 40).

In the particular case (illustrated chain-dotted in FIG. 1) of following a preprogrammed flight plan (when the altitude and/or speed constraints are known in advance and geographically positioned), the constraints are defined by the flight plan (element 41). The crew merely has the task of validating the constraints of the flight plan with the aid of the means 4 (link 42). The validation fixes the distance of attainment of the speed and/or altitude target. For the control loop, the origin of the constraints is transparent.

In the particular case of following a preprogrammed flight plan, the flight management system of FMS type constructs the trajectory flown by the aircraft. This trajectory is thereafter displayed by way of the display means 9 (which receive it via a link 43).

Figure 5:
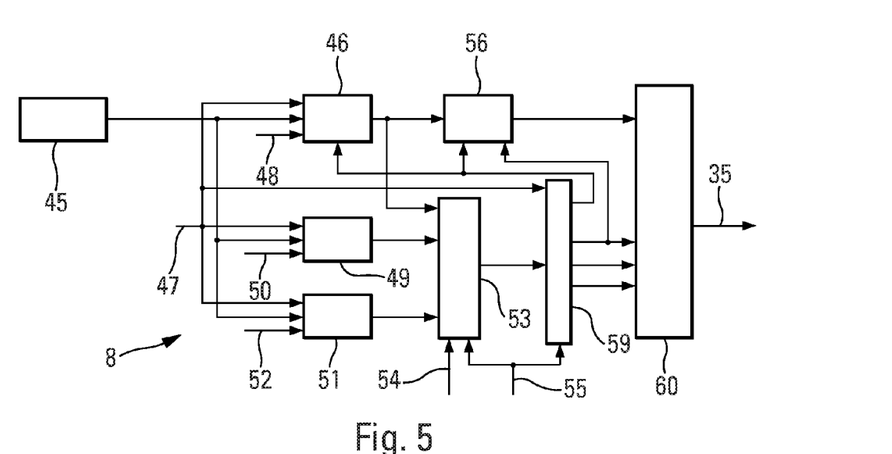
FIGS. 5 to 7 are the schematic diagrams of calculation means of a device in accordance with the invention.

According to the invention, the calculation of the predicted trajectory is based on the knowledge of the operational logic, of the lateral, vertical and speed guidance laws of the automatic pilot, as well as on the performance of the aircraft, such as represented in FIG. 5.

The means 8 comprise in particular, as represented in this FIG. 5:

- an operational logic 45 which receives the engaged and armed modes, the setpoints and runway information, and which emits the prediction mode;
- a lateral modeling 46 which receives current and past parameters (link 47), a lateral setpoint (link 48), and a true speed of a means 59, as well as the prediction mode, and which calculates an angle of roll;
- a speed modeling 49 which receives current and past parameters (link 47), a speed setpoint (link 50), as well as the prediction mode, and which calculates an acceleration;
- a vertical modeling 51 which receives current and past parameters (link 47), an altitude setpoint (link 52), as well as the prediction mode, and which calculates a slope;
- a flight dynamics logic 56 which receives the angle of roll, a true speed of the means 59 and the wind, and which calculates the heading;
- a performance module 53 for the aircraft which receives the angle of roll, the acceleration and the slope, as well as information relating to the aircraft (link 54) and atmospheric data (link 55), and which calculates an acceleration/slope pair;
- the processing means 59 which calculates, on the basis of this pair, of the current and past parameters (link 47) and of atmospheric data (link 55), the wind, the true speed, the ground speed and the altitude; and
- a trajectory calculation means 60 which deduces the trajectory and the positions of attainment of the speed and altitude setpoints with the aid of the heading, of the wind, of the ground speed and of the altitude.

Two different modes of calculation can be implemented for the trajectory calculation:

- a first mode of calculation uses a vector calculation. An entire trajectory is calculated initially. The lateral, vertical and speed evolutions are predefined according to experience and parameterized according to a list of parameters representing the past state and the current state of the flight of the aircraft. The outputs are the trajectory vectors x, y, s, z and the position x, y, s, z of attainment of the speed and altitude target values. The lateral (x, y), vertical z and curvilinear s coordinates are defined in the frame of reference of the aircraft. In the case of a change of mode detected in the prediction horizon, the vector calculation is redone on the basis of this change of mode. This vector calculation can also be re-executed to take into account more precise performance data of the aircraft, the wind, the temperature until stabilization of the precision is attained; and
- a second mode of calculation can be of iterative type. The flight parameters of the current and previous iterations are required so as to calculate the position of the aircraft at the following iteration. The lateral, vertical and speed modeling is closer to the guidance laws in this second mode of calculation.

Figure 6:
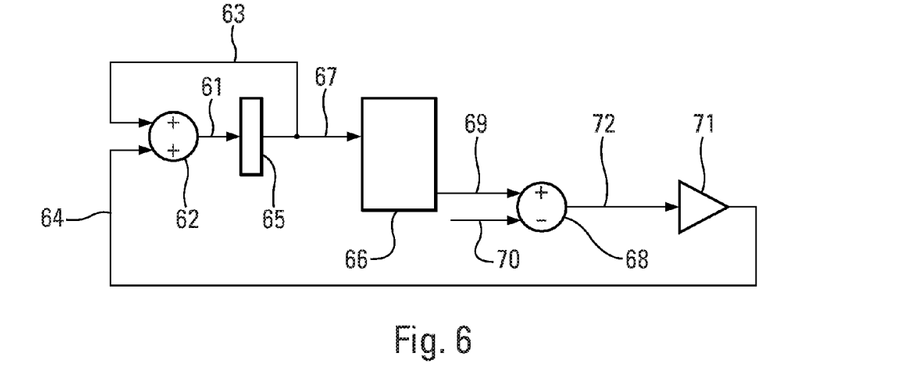

In the case of a constraint imposed by the pilot, when the aircraft is in climb or descent mode while complying with a vertical speed (V/S) or a slope (FPA), the trajectory prediction function can be used to calculate the setpoint in terms of V/S or FPA causing the trajectory to pass as close as possible to the constraint imposed by the pilot. FIG. 6 illustrates a way of using the trajectory prediction to deduce therefrom a constrained climb rate (V/S or FPA) on the basis of a constraint on the target altitude.

In this FIG. 6 have been represented:

- a means 62 which computes the sum of the target climb rate (received through a link 63) and of a correction of the target climb rate (received through a link 64);
- a means 65 for initiating the target climb rate (with a link 61 between the means 62 and 65);
- a means 66 for calculating the trajectory (connected to the initiation means 65 by a link 67), which provides the distance in front of the aircraft at which the target altitude will be attained;
- a means 68 which calculates the difference between the distance of attainment of the target altitude received from the calculation means 66 through a link 69 and a constraint on the target altitude received through a link 70; and
- a means 71 which multiplies this difference, illustrating a target altitude attainment distance error received through a link 72, by a gain and which communicates the value obtained through the link 64.

The principle is to compare the attainment of the target altitude with a value of target climb rate, to look at the error of this prediction with respect to the constraint fixed by the pilot, and on the basis of this error, to generate a correction of the value of the target climb rate. In tandem with the iterations, one then succeeds in deducing therefrom the value of the target climb rate passing as close as possible to the constraint.

Moreover, means 73 (represented in FIG. 7) forming part of the means 36 calculate the airbrakes command to be applied, the mean airbrakes profile and the engine command. The means 73 are based on the calculation of the target total slope. This calculation allows the estimation of the mean level of airbrakes to be applied along the trajectory. The estimation is made on the basis of the knowledge of the performance of the aircraft. Thereafter, this mean level of airbrakes is adjusted with a servocontrol which takes account of the current total slope of the aircraft.

Figure 7:
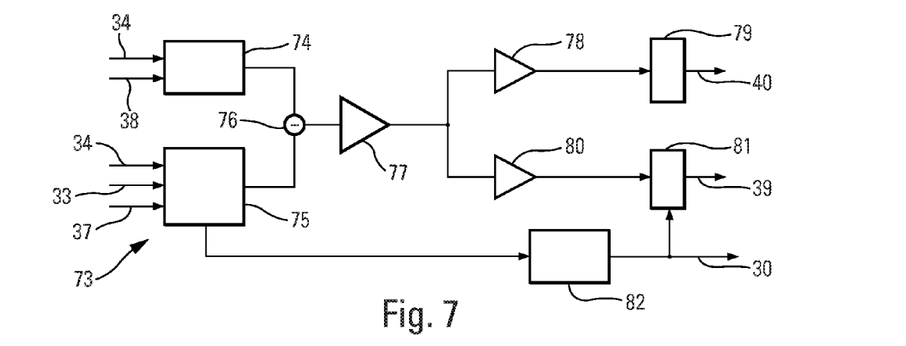

Accordingly, said means 73 comprise, as represented in FIG. 7:

- a means 74 for calculating the total slope, which receives atmospheric data (via the link 34) and current flight parameters (via the link 38);
- a means 75 for calculating the total slope target which receives atmospheric data (via the link 34), constraints (via the link 37) and current flight parameters (via the link 33);
- a calculation means 76 which computes the difference between the total slope and the total slope target;
- an element 77 which multiplies this difference by a gain;
- elements 78 (for gain multiplication) and 79 (for integration) which calculate the control values for the engines;
- elements 80 (for gain multiplication) and 81 (for integration) which calculate the control values for the airbrakes; and
- a performance module 82 for the aircraft which receives the total slope target and the configuration of the aircraft and which determines an airbrakes profile (which is transmitted by the link 30) and a mean level of airbrakes (which is transmitted to the element 81).

Figure 8:
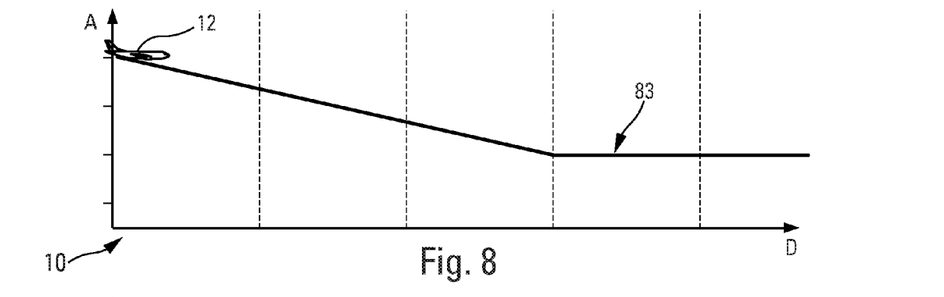
FIGS. 8 to 10 illustrate various successive displays, relating to a particular example of implementation of the invention.
Figure 9:
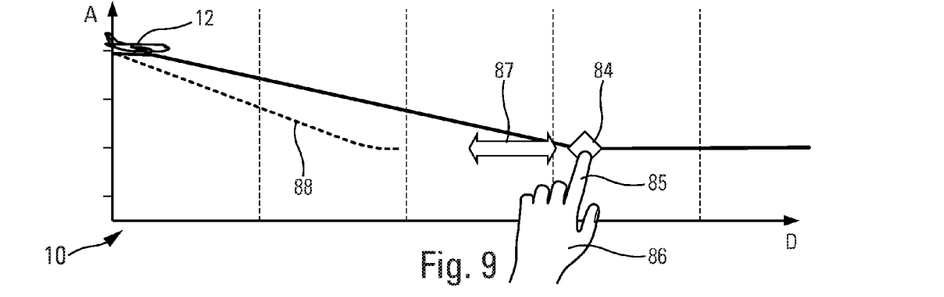
Figure 10:
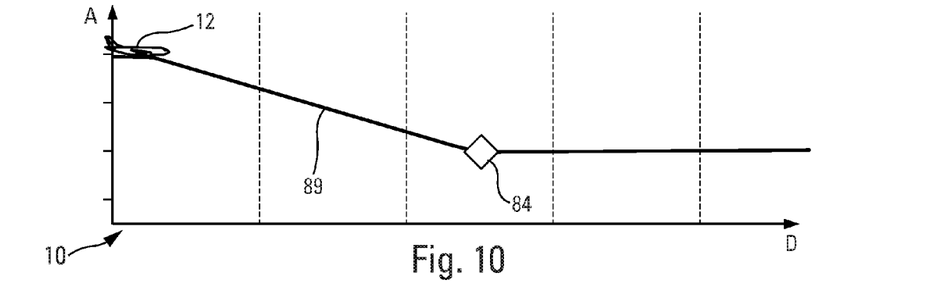

In FIGS. 8 to 10 is presented an example illustrating the steps and the associated actions/displays, during the creation of a rendezvous in terms of altitude, from a mode of descent without constraint. Thus:

firstly the pilot selects on the interface unit 2 a new altitude value and validates it. The device 1 then generates a feedback in real-time of the trajectory which will be flown. FIG. 8 illustrates the prediction of the trajectory flown by the aircraft without deflection of airbrakes, with the altitude target 83;

the pilot thereafter specifies the distance in front of the aircraft at which he wishes to attain the new altitude setpoint. He does so, in this example, by interacting directly before the point at which the target altitude level is achieved, by acting on a graphical object 84 with a finger 85 of his hand 86. This graphical object 84 can thus be moved as illustrated by a double arrow 87. Right from the start of the interaction, a trajectory 88 for achieving the target level at the earliest possibility (with full deflection of airbrakes) is displayed so that the pilot can view his latitude of action; and after the introduction of a geographical constraint, as long as the constraint has not been attained, the means 5 carry out the servocontrol in respect of the upholding of this constraint, by undertaking adjustments of the airbrakes, if necessary, subsequent to outside disturbances (wind etc.).

In FIG. 10 is represented the trajectory 89 flown by the aircraft with the airbrakes deflection necessary to hold the constraint.

The invention claimed is:

1. A method for aiding management of a flight of an aircraft, the method comprising:
    a speed setpoint and an altitude setpoint, as well as an automatic piloting system, which apply, in an automatic manner, to the aircraft the setpoints thus entered;
    generating at an interface a geographical constraint represented by a distance ahead of the aircraft, the geographical constraint defining a position at which a pilot wishes that the setpoint entered be attained;
    generating a point at which at least one of the entered speed setpoint and altitude setpoint is attained the setpoint entered is attainable by the aircraft at an earliest possibility; and
    automatically servocontrolling an automatic thrust system and airbrakes of the aircraft, in a combined manner, so that the aircraft attains the setpoint entered, at the position defined by the geographical constraint.

2. The method as claimed in claim 1, further comprising automatically determining a trajectory flown by the aircraft according to the setpoints of an active guidance mode and according to a thrust and airbrakes profile, which is controlled so as to attain the setpoint at the geographical constraint, wherein at least one part of the trajectory is presented on a viewing screen, together with the positions at which the speed and/or altitude setpoints are attained.

3. The method as claimed in claim 2, wherein there is envisaged on the viewing screen at least one graphical object which is effected in the form of an interactive element which represents:
    a restitution element which indicates the position of attainment of the setpoint; and
    a control element which can be grasped and moved by the pilot in order to modify the distance ahead of the aircraft at which the pilot wishes that the setpoint entered be attained, and thus to generate the geographical constraint.

4. The method as claimed in claim 1, further comprising determining an airbrakes profile which ensures the attainment of the geographical constraint generated by the pilot, while satisfying at least one particular optimization criterion.

5. The method as claimed in claim 1, wherein a symbol, which locates the point at which the setpoint entered is attainable by the aircraft at the earliest possibility, is presented on a viewing screen.

6. The method as claimed in claim 2, further comprising determining and integrating transient phases of the flight trajectory into a display.

7. The method as claimed in claim 1, further comprising determining and displaying a predicted trajectory liable to be followed by the aircraft with the airbrakes deflected to a maximum.

8. The method as claimed in claim 1, further comprising defining a new target value corresponding to the attainment of a target altitude at the distance ahead of the aircraft, when the aircraft is climbing or descending while complying with a vertical speed setpoint or a slope setpoint.

9. The method as claimed in claim 1, wherein the method is applied to preadjusted setpoints, which will only be applied to the aircraft after a validation.

10. The method as claimed in claim 2, wherein the method is applied in a particular case of following a preprogrammed flight plan.

11. A device for aiding management of a flight of an aircraft, the device comprising:
    a flight control interface unit allowing a pilot to enter at least one of a speed setpoint and an altitude setpoint, as well as an automatic piloting system, which apply, in an automatic manner, to the aircraft the setpoints entered with an aid of the flight control interface unit, which comprises moreover:
    an interface allowing the pilot to generate a geographical constraint, the geographical constraint being represented by a distance ahead of the aircraft and defining a position at which the pilot wishes that the setpoint entered be attained, the interface also allowing the pilot to generate a point at which at least one of the entered speed setpoint and altitude setpoint is attained the setpoint entered is attainable by the aircraft at an earliest possibility; and
    servocontrols which automatically control, in a combined manner, an automatic thrust system and airbrakes of the aircraft so that the aircraft attains the setpoint entered, at the position defined by the geographical constraint.

12. The device as claimed in claim 11, further comprising:
    a trajectory predictor for determining, in an automatic manner, a trajectory followed by the aircraft so as to comply with the setpoint and the geographical constraint; and
    displays for presenting the trajectory on a viewing screen.

13. The device as claimed in claim 12, wherein the viewing screen comprises at least one graphical object which is effected in the form of an interactive element which represents:
    a restitution element which indicates the position of attainment of the set point; and
    a control element which can be grasped and moved by the pilot in order to modify the distance ahead of the aircraft at which the pilot wishes that the setpoint entered be attained, and thus to generate the geographical constraint.

14. The device as claimed in claim 11, wherein the servocontrols comprise automatic determination of controls of the thrust system and the airbrakes.

15. An aircraft, which comprises a device for aiding management of a flight of an aircraft, the device comprising:
- a flight control interface unit allowing a pilot to enter at least one of a speed setpoint and an altitude setpoint, as well as an automatic piloting system, which apply, in an automatic manner, to the aircraft the setpoints entered with an aid of the flight control interface unit, which comprises moreover:
- an interface allowing the pilot to generate a geographical constraint, the geographical constraint being represented by a distance ahead of the aircraft and defining a position at which the pilot wishes that the setpoint entered be attained, the interface also allowing the pilot to generate a point at which at least one of the entered speed setpoint and altitude setpoint is attained the setpoint entered is attainable by the aircraft at an earliest possibility; and
- servocontrols which automatically control, in a combined manner, an automatic thrust system and airbrakes of the aircraft so that the aircraft attains the setpoint entered, at the position defined by the geographical constraint.

* * * * *